W. M. McQUEEN.
SPRING WHEEL.
APPLICATION FILED NOV. 6, 1917.
1,261,253. Patented Apr. 2, 1918.
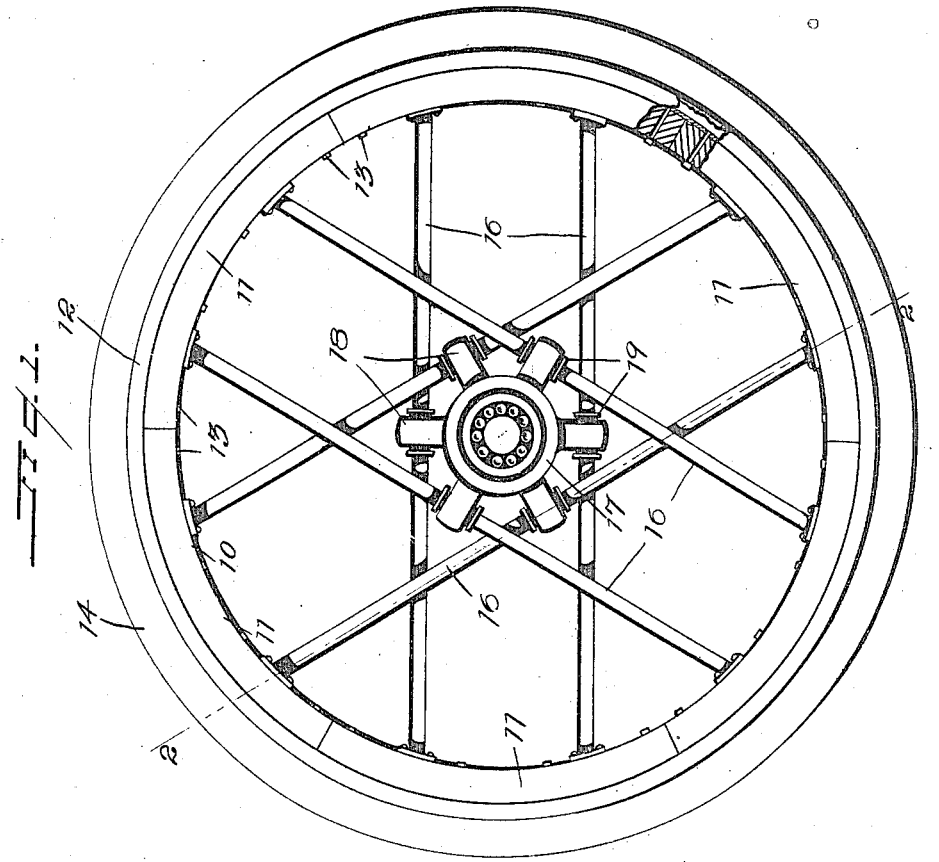
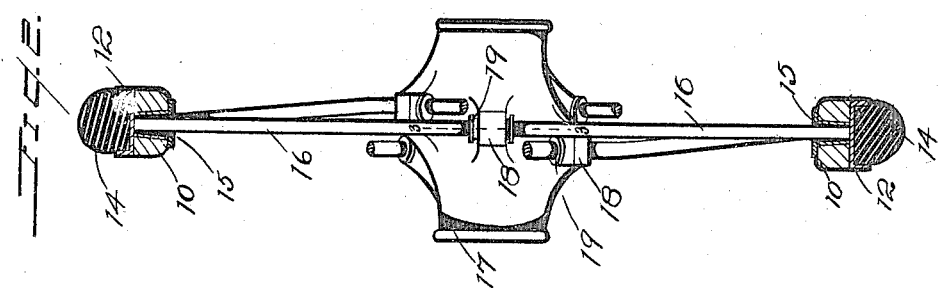
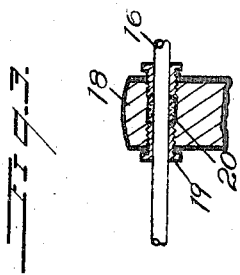
WITNESSES
George C. Myers.
Myron E. Clear
INVENTOR
WILLIAM M. McQUEEN,
BY
ATTORNEYS

UNITED STATES PATENT OFFICE.

WILLIAM MURDOCK McQUEEN, OF PRISCILLA, MISSISSIPPI.

SPRING-WHEEL.

1,261,253.  Specification of Letters Patent.  Patented Apr. 2, 1918.

Application filed November 6, 1917. Serial No. 200,539.

*To all whom it may concern:*

Be it known that I, WILLIAM MURDOCK McQUEEN, a citizen of the United States, and a resident of Priscilla, in the county of Washington and State of Mississippi, have invented a new and useful Improvement in Spring-Wheels, of which the following is a specification.

My present invention relates generally to vehicle wheels, and more particularly to a spring wheel, the object of which is to do away with the necessity for the use of an inflated tire and to thereby obtain the advantages of a solid tire, and do away with the disadvantages in cost, maintenance, and puncturing of inflated tires.

Generally speaking, my invention proposes an extremely simple construction of spring wheels including a felly portion having a solid tire, if any, and a hub portion, together with a plurality of spokes, each of which extends in one piece entirely across the wheel and has loose bearings at its ends in connection with the felly portion, and is further provided with an intermediate bearing upon the hub, the series of spokes being extended tangentially with respect to the hub and crossing one another angularly between the hub and the felly portion, whereby to flexibly suspend the hub in a degree of elasticity dependent upon the gage of the spokes themselves.

My invention thus proposes an arrangement capable of application to heavy as well as light vehicles, and as presently described, will be seen to possess both strength and durability in a marked degree.

In the accompanying drawings illustrating my invention:

Figure 1 is a side elevation of a wheel constructed in accordance with my invention, partly broken away and in section.

Fig. 2 is a sectional view taken substantially on line 2—2 of Fig. 1, and

Fig. 3 is a detail fragmentary section taken substantially on line 3—3 of Fig. 2.

Referring now to these figures, I have generally indicated the felly at 10, which I preferably form of a plurality of segments 11 in order to permit of more ready assemblage of the wheel assembled around and within a flanged metallic rim 12 in one piece to which the several segments are connected by bolts, screws, and the like, 13.

The flanged rim 12, as best seen in Fig. 2, thus presents a channeled outer space for the reception of a solid tire 14 of suitable construction and material, and serves to effectively hold the several segments of the felly 10 in their assembled end to end relation.

Referring again to the felly 10, it will be noted that I provide a plurality of sockets therein, opening at the inner periphery of the felly, and preferably lined by metallic thimbles 15, the sockets and the thimbles being tapered, with their enlarged ends presented inwardly, to loosely receive the extremities of the spokes 16 in such a manner as to permit of flexing of the said spokes at an intermediate point.

By referring again to Fig. 1, it will be noted that the spokes 16 extend entirely across the wheel, tangentially with respect to the hub 17, and in angular crossing relation with respect to one another, the several spokes crossing one another in the space between the hub 17 and the felly 10 and having bearing at intermediate points upon the hub 17 by virtue of the construction of the latter, which will now be described.

The hub 17 is disposed centrally of the wheel in its normal position, as usual, and is wholly suspended by virtue of its engagement with the intermediate portions of the several spokes, so that it is full floating, and the degree of its elastic support depends upon the gage, and possibly the material, of the spokes themselves.

The hub 17 has an annular series of externally projecting and apertured bosses 18, certain of which are in the median plane of the wheel, and certain of which are displaced laterally at opposite sides of the median plane, each of the spokes 16 extending at a substantially central point through the aperture of its respective bearing boss 18, which latter is internally threaded as seen in Fig. 3 for the reception of glands 19 surrounding the respective spokes, and designed to inclose the packing 20 between their inner ends and within the bore of the bearing boss 18, in order that when the hub 17 is under pressure in use, the several spokes will move through the bearing in a substantially noiseless manner in addition to their flexing movements under the weight imposed.

It is therefore obvious that the construction as described is fully capable of carrying out the objects first above stated, and that as shown, my improved wheel is readily adaptable to both light and heavy vehicles, and will be strong and durable in use.

I claim:

A spring wheel comprising a felly portion including a sectional felly the sections of which have their ends abutting, a solid rim to which the several sections of the felly are joined, a tire carried by the rim, said sections of said felly having a plurality of internally opening sockets therethrough and conical thimbles in said sockets, a central hub having a plurality of outwardly projecting apertured bearing bosses, and a series of spring spokes disposed tangentially with respect to the hub and crossing one another in the space between the hub and the felly portion, said spokes extending at intermediate points through the bearing bosses of the hub and having their extremities projecting into the sockets of the felly.

WILLIAM MURDOCK McQUEEN.

Copies of this patent may be obtained for five cents each, by addressing the "Commissioner of Patents, Washington, D. C."